Feb. 13, 1945. H. K. FERGER 2,369,223
AUTOMATIC WORK LOCATOR
Filed May 26, 1944
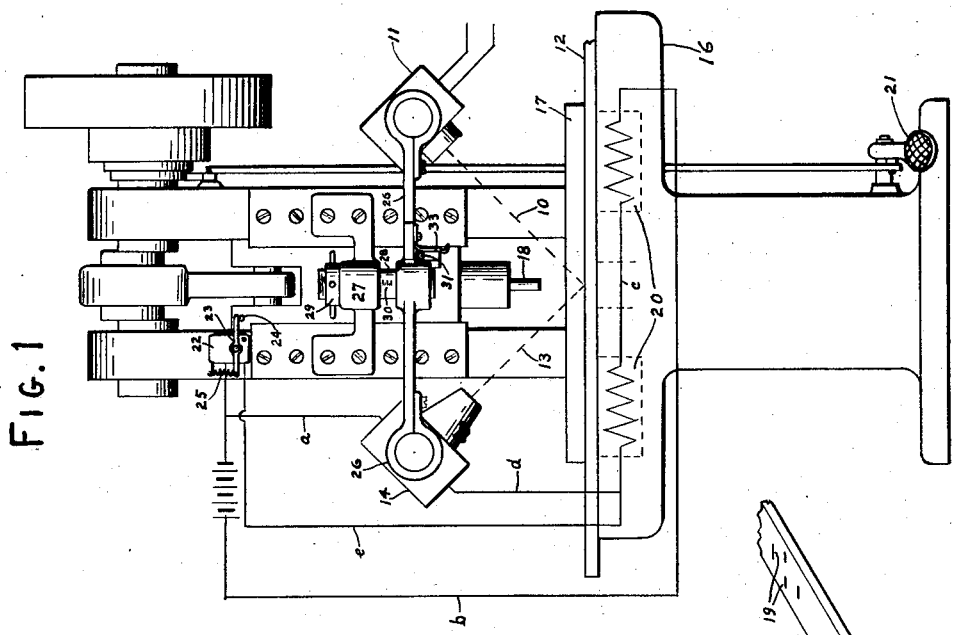
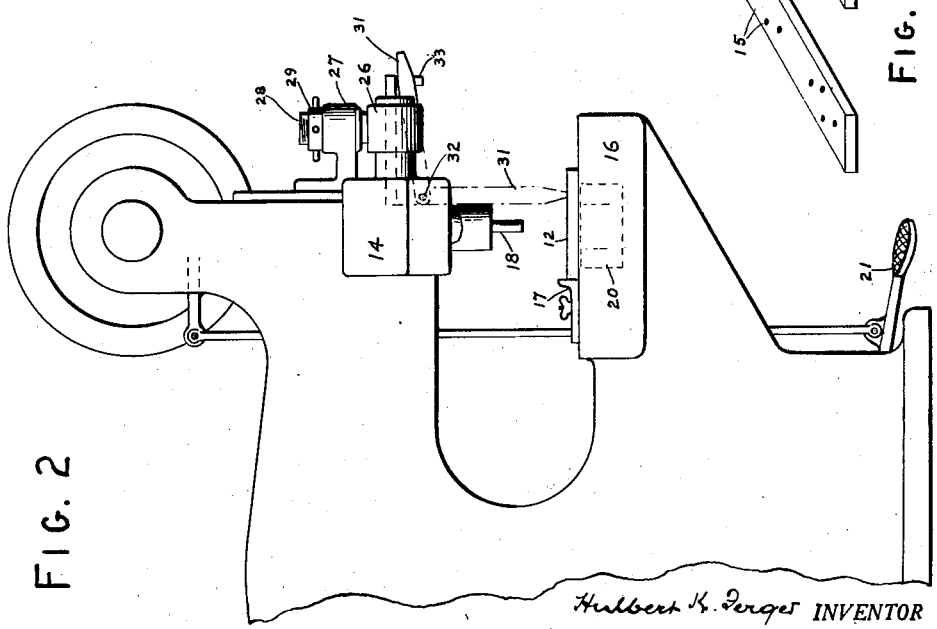
Hulbert K. Ferger INVENTOR
BY
Emery, Varney, Whittemore & Dix
Attorneys.

Patented Feb. 13, 1945

2,369,223

UNITED STATES PATENT OFFICE 2,369,223

AUTOMATIC WORK LOCATOR

Hulbert K. Ferger, Flushing, N. Y., assignor of one-half to John B. Thomson, Plandome, N. Y.

Application May 26, 1944, Serial No. 537,396

10 Claims. (Cl. 164—110)

My invention relates particularly to automatic work locators for use in various mechanisms such as machines for punching, drilling, reaming, tapping, etc., whereby a work-piece or blank may be readily brought into accurate position for operation upon it and then held stationary in that position while an operating tool moves upon it to effect the operation and returns again to its normal or starting position.

In the drawing which illustrates how my invention may be used with a conventional form of punch press, Figs. 1 and 2 are respectively front and side elevations of the press, and Fig. 3 is illustrative of work-pieces which have been prepared for punching in accordance with my invention.

The broken line 10 in Fig. 1 denotes a continuously maintained light beam emanating from a source of light 11 and directed upon a work-piece 12, and the broken line 13 denotes the reflection of this beam from its point of incidence on the work-piece to a light-actuated element such as an electric eye 14. The light-source and the optical center of the electric eye are preferably at the same level so that an imaginary line passing through both would be horizontal. To indicate the places to be punched, the work-piece is previously marked by small dots 15, say, about ⅛ of an inch in diameter, with a suitable light-reflecting material so that only when the light beam impinges upon one of these dots will it be reflected into the electric eye. It will be understood, of course, that the face of the work-piece upon which the beam falls should have a dull, i. e., substantially non-reflecting, surface so that the beam will be absorbed except when it impinges on the light-reflecting material, and also that this face, or at least the marked portions thereof, should be flat in order that the reflected beam may be properly directed thereby into the electric eye. The work-piece may be moved by hand upon the table 16 of the press to bring the dots successively into the path of the beam 10 or, if preferred, by any suitable mechanical means; and if the table is provided with an adjustable guide, as 17, for the work-piece to contact as it moves along the table under the movable punching tool 18, the work-piece may be marked with narrow lines 19, instead of with dots, such lines being perpendicular to, or at least angularly disposed in relation to, the direction in which the work-piece moves during the punching operation.

The punching tool, as it is shown in the drawing, is disposed above the table and moves in a path perpendicular thereto toward and from the work-piece; and the path of said tool together with the optical center of the electric eye determine the plane in which the light beam 10 is to be projected from the light-source 11, wherefore said plane will be perpendicular to the upwardly facing surface of a flat work-piece resting upon the table. Moreover, the beam 10 will intersect the path of the tool; and for the purpose of readily adjusting the press for operation on work-pieces of different thicknesses, as hereinafter explained, the beam is preferably directed so as to intersect said path at a predetermined point or distance below an imaginary line passing through the light-source and the optical center of the electric eye.

The press is provided with a magnetic chuck 20, or preferably with a pair of such chucks located, as indicated in Fig. 1, near the table top, one on each side of the vertical path which the punching tool traverses, so that the metallic work-piece will always be within the operating range of one or both chucks. The energization of the chucks will occur each time a dot (or line) on the work-piece is brought into position for the beam 10 to impinge upon so as to be reflected into the electric eye 14 and thereby close the circuit $a$, $b$, $c$, $d$. Thereupon the chucks will operate to hold the work-piece stationary and in proper position upon the press table for punching a hole or depression in the work-piece; and then the punching tool may be caused to descend by depressing the foot pedal 21.

Since it is important that the work-piece be held firmly to the table top not only before the punching tool starts to descend but continuously until the tool has returned again to its normal or starting position, a switch-controlled by-pass $e$ around the electric eye is preferably provided in the aforesaid circuit to keep the chucks energized after the tool has descended upon the work-piece and interrupted the beam or removed the dot upon which the continued reflection of the beam to the electric eye depends. The control switch 22 therefor may have a lever 23 located in the path of any moving part of the press which operates in synchronism with the punching tool, such as a lug 24 on the reciprocating head in which the punching tool is mounted. Normally, the lever 23 is held in position by the lug 24 against the tension of a spring 25 to keep the circuit through the by-pass $e$ normally open; but when the tool begins its descent, the lug moves away from the lever which is then actuated by the spring to close the circuit through the by-pass, the lever being brought back to its normal position again by the lug when the tool has returned to its starting position.

Both the light-source and the electric eye are preferably mounted upon the ends of a horizontal bar 26 and angularly set thereon to adapt the press for operating upon a work-piece of a given thickness, in which case the angular setting of the light-source and electric eye will be such as to cause the light beam 10 to intersect the path of the tool at the point where the latter contacts a work-piece of that thickness. Then by adjustably supporting the bar 26 for raising and lowering, the press may be adapted for operating on work-pieces of different thicknesses without the necessity of changing each time the angular setting of the light-source and electric eye on the horizontal bar. For this purpose, said bar may be hung from a bracket 27 on the press frame by a rod 28 vertically slidable in the bracket and supported by an adjusting nut 29 threaded to the rod and resting on the top of the bracket. Thus, by turning the nut, the position of the bar may be adjusted up or down so as to bring the light-source and electric eye at the proper level in relation to the marked face of the work-piece; and by providing the rod with graduations 30 calibrated to accord with different thicknesses of work-pieces, the mechanism may be quickly adjusted for each case. As an alternative means in lieu of the graduations aforesaid, a gage-arm 31 may be provided which is rotatable about a hinge pin 32 on the bar 26 and normally held in a substantially horizontal position by a spring catch 33. When a work-piece is placed on the press table for punching, the bar 31 is swung into a vertical position (indicated in Fig. 2) and the adjustable nut 29 is turned until the end of the gage-arm contacts with the work-piece whereupon the gage-arm is then swung back to its horizontal position.

Thus, in operation on a work-piece of any thickness, the light beam will always intersect the path of the punching tool at a predetermined point or distance below the level of the light-source, and when the work-piece is moved so as to bring one of the marked dots (or lines) into conjunction with this predetermined point, the beam will be reflected into the electric eye, thus closing the circuit through the magnetic chucks which remains closed until the punching tool completes its operating cycle.

While the spot or mark placed upon the work-piece must be brought into the path of the light beam 10 in order to actuate the electric eye, it is not essential in practising my invention that the operating tool shall contact that precise spot or mark when operating upon the work-piece; and hence if it is more convenient, or desirable for any other reason, to place the spot or mark at a given distance from the point where the operating tool is to contact the work-piece, this may be done without departing from my invention. In such a case the electric eye and light-source will be located in a plane parallel to the path of the punching tool at said given distance, and the beam 10 will be projected in that plane and directed so as to intersect a plane perpendicular to the path of the punching tool at a predetermined point or distance below the level of the light-source depending upon the thickness of the work-piece to be operated upon. In that case also, a guide for the work-piece, such as 17 aforesaid, set at the same given distance from the path of the tool, will preferably be used.

Moreover it will be obvious that my invention may be practised with work-pieces having light-reflecting surfaces, as aluminum for example, in which case the surface would be marked with light-absorbing material instead of light-reflecting material. In such a case the electric eye would be constantly actuated except when interrupted by the impingement of the light beam 10 upon a light-absorbing mark. Also, where aluminum and other non-magnetic work-pieces are to be operated upon, a mechanical chuck (or chucks) operatively controlled by the electric eye circuit would be used in place of the magnetic chuck or chucks heretofore referred to. Indeed, in any case, if preferred, non-magnetic chucks may be employed without departing from my invention.

For accurately marking the face of the work-piece with the light-reflecting material, I preferably use a special marking device which constitutes the subject matter of a patent application filed by me concurrently herewith.

I claim as my invention:

1. The method of accurately positioning a work-piece on a work-table for operation thereupon by a tool whose path is fixed in relation to the table and to a photo-electric-cell-controlled work-holding chuck, said method comprising: placing a mark on the work-piece; projecting, in a plane passing through the optical center of the photo-electric cell and also perpendicular to the work-table, a beam of light so directed that a plane parallel to the table, and at a distance above the table equal to the thickness of the work-piece, will be intersected by the beam at a point such that the path of the beam and an imaginary line connecting said point with the optical center of the photo-electric cell will form equal angles with said parallel plane; and moving the work-piece on the work-table to bring the mark on the work-piece into conjunction with said point.

2. The method of positioning a work-piece on a work-table and then operating on said work-piece with a tool which has an idling position and whose operative path is fixed in relation to the table and to a photo-electric-cell-controlled work-holding chuck, said method comprising: placing a mark on the work-piece; projecting in a plane passing through the optical center of the photo-electric cell and also perpendicular to the work-table, a beam of light so directed that a plane parallel to the table and at a distance from the table equal to the thickness of the work-piece will be intersected by the beam at a point such that the path of the beam and an imaginary line connecting said point with the optical center of the photo-electric cell will form equal angles with said parallel plane; moving the work-piece on the work-table to bring the mark on the work-piece into conjunction with said point thereby causing the chuck to hold the work-piece stationary; then causing the tool to move upon the work-piece from its idling position and return again to its idling position while the hold of the chuck on the work-piece is maintained; and finally causing the chuck to release its hold on the work-piece after the tool has returned to its idling position.

3. In a machine of the class referred to, the combination with a work-table, of a tool normally held stationary but adapted to move to and from the work-table for operation upon a work-piece, means to start the tool in operation from its idling position, clamping means to hold the work-piece in operative position on the work-table, a light-actuated element to control the actuation of the clamping means, a light source for projecting a beam of light onto the work-piece, said light source and the optical center of the light-actuated element lying in a plane perpendicular to the table, and means operatively related to the tool to cause the release of the work-piece from the clamping means after the tool has completed its operation on the work-piece and returned to its idling position.

4. The method of accurately positioning a work-piece in relation to an operating tool and then holding it stationary for operation thereupon, comprising: placing a light-actuated element and a work-holding chuck controlled thereby in juxtaposition to said tool so that when the work-piece is brought into the path of said tool it will be within the operating range of said chuck, projecting a beam of light in a plane determined by said path and the optical center of said element and directed so that it will intersect the path of said tool at a predetermined point, marking a place on the work-piece with a light-reflecting material, and moving the work-piece to bring the marked place into conjunction with said point.

5. The method of accurately positioning a work-piece having a substantially flat face under a vertically movable operating tool and then holding it stationary for operation thereupon, comprising: placing a light-reflecting element and a magnetic chuck controlled thereby in juxtaposition to said tool so that when the work-piece is brought into the path of said tool it will be within the operating range of said chuck, projecting a beam of light in a plane determined by said path and the optical center of said element and directed so as to intersect the path of said tool at a predetermined point, marking a place on the flat face of the work-piece with a light-reflecting material, and moving the work-piece to bring the marked place into conjunction with said point while keeping the flat face of the work-piece perpendicular to said plane.

6. The method of accurately positioning a work-piece in relation to the path of a movable tool of a machine provided with means to hold the work-piece stationary when so positioned and a light-actuated element controlling the operation of said holding means, which method comprises projecting a beam of light in a plane determined by said path and the optical center of said element and directed so as to intersect said path at a predetermined point, marking a place on the surface of the work-piece with a light-reflecting material, and moving the work-piece to bring the marked place into conjunction with said point so that the light-reflecting material will cause said beam to be directed into said light-actuated element.

7. In a machine of the class referred to, the combination with a movable tool and a work table, of means to hold a work-piece stationary on said table when in position to be operated upon by the tool, a light-actuated element controlling the operation of said means, and a light-source for projecting a beam of light onto the work-piece, said light-source and the optical center of said light-actuated element and the path of said tool all lying in a single plane which is perpendicular to said table.

8. In a machine of the class referred to, the combination with a movable tool and a work table, of means to hold a work-piece stationary on said table when in position to be operated upon by said tool, a light-actuated element controlling the operation of said means, a light-source for projecting a beam of light onto the work-piece, and means movable toward and from the table for supporting both said light-source and said light-actuated element so that the positions of both said source and said element may be adjusted together in relation to the work-piece, said light-source and the optical center of said light-actuated element lying in a plane which is perpendicular to said table and parallel to the path of said tool.

9. In a machine of the class referred to, the combination with a movable operating tool and a table to support the work-piece to be operated upon, of a magnetic chuck located near the top of said table to hold the work-piece stationary when in position to be operated upon, a light-actuated element to control the circuit through said chuck and having a by-pass around said light-actuated element, a switch operated by said tool to open and close the circuit through said by-pass, and a light-source for projecting a beam of light onto the work-piece, said light-source and the optical center of said light-actuated element lying in a plane which is perpendicular to said table and parallel to the path of said tool.

10. In a machine of the class referred to, the combination with a movable operating tool and a table to support the work-piece to be operated upon, of a pair of magnetic chucks located near the top of said table one on each side of the path of said tool to hold the work-piece stationary when in position to be operated upon, a light-actuated element to control the circuit through said chucks, and a light-source for projecting a beam of light onto the work-piece, said light-source and the optical center of said light-actuated element lying in a plane which is perpendicular to said table and parallel to the path of said tool.

HULBERT K. FERGER.